United States Patent [19]
Dodges et al.

[11] 3,952,378
[45] Apr. 27, 1976

[54] MECHANICAL CLOSURE DEVICE

[75] Inventors: Carl Dodges, Sparta; Ernest Petrocco, Dover, both of N.J.

[73] Assignee: The United States of America as represented by the Secretary of the Army, Washington, D.C.

[22] Filed: Feb. 4, 1975

[21] Appl. No.: 546,955

[52] U.S. Cl............................................. 24/201 LP
[51] Int. Cl.²........................................ A44B 17/00
[58] Field of Search..... 24/201 D, 201 BN, 201 HE, 24/201 R, 201 S, 261 R, 261 CF, 261 AC, 261 WC, 230 F, 265 SC, 201 LP, 230 LP

[56]           References Cited
         UNITED STATES PATENTS

| | | | |
|---|---|---|---|
| 510,333 | 12/1893 | Draper | 24/201 D |
| 1,049,446 | 1/1913 | Brown | 24/201 BN |
| 1,179,282 | 4/1916 | Clark | 24/201 R |
| 2,647,379 | 8/1953 | Ferro | 24/201 D |

FOREIGN PATENTS OR APPLICATIONS

| | | | |
|---|---|---|---|
| 26,624 | 12/1904 | United Kingdom | 24/201 LP |
| 230,751 | 6/1961 | Austria | 24/201 D |

*Primary Examiner*—Donald A. Griffin
*Attorney, Agent, or Firm*—Nathan Edelberg; Robert P. Gibson; Ronald M. Spann

[57]           ABSTRACT

An improved means of closure comprising in combination two formed adjoining unextended co-members, such as the ends of a grommet, and a third formed resilient locking member pivotally mounted on one of the two formed adjoining unextended co-members.

8 Claims, 4 Drawing Figures

MECHANICAL CLOSURE DEVICE

GOVERNMENTAL INTEREST

The invention described herein may be manufactured, used and licensed by or for the Government for governmental purposes without the payment to me of any royalty thereon.

BACKGROUND OF THE INVENTION

At the present state of the art grommet or grommet-like closing means are known. One example is the use of the familiar farmer's baling wire to close a grommet. Another means of effecting closure of a grommet is to construct it of resilient material such that the grommet may be expanded within its elastic limit to fit over and spring back to snugly fit an apparatus for which the grommet is intended.

SUMMARY OF THE INVENTION

The present invention provides a positive means of engagement or securing of adjoining members, such as the ends of a grommet, under a no-load or stressless state.

DETAILED DESCRIPTION OF ONE EMBODIMENT

Figure 1:
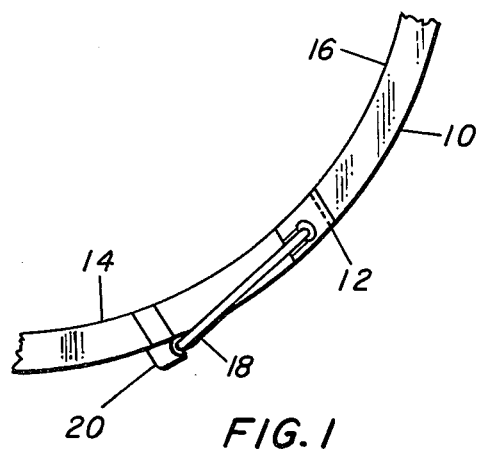
FIG. 1 is a side view of a mechanical closure device embodying the principles of my invention.

Referring to the drawings wherein like numerals refer to like parts, FIG. 1 shows a mechanical coupling device 10 having two adjoining ends in the coupled position as the device appears from its side. The dotted line 12 signifies where the first member end 14 of the device 10 terminates when the device 10 is closed. Mounted in the second member end 16 is the pivotable resilient fastener 18 and in the first end 14 is a catch 20 which retains or holds the fastener 18 in its closed position.

Figure 2:
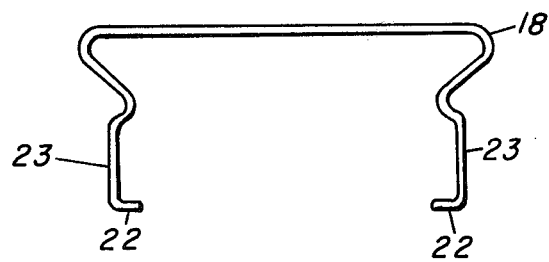
FIG. 2 is a plan view of the pivotable resilient fastener.
Figure 3:
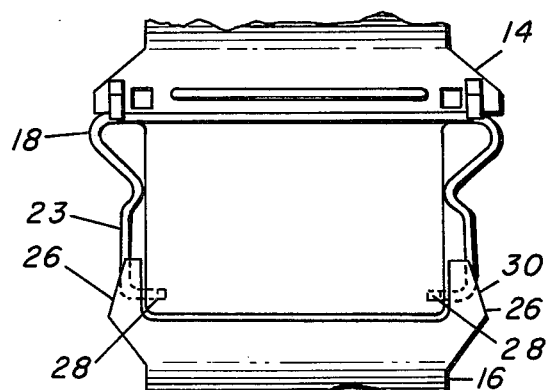
FIG. 3 is a fragmentary diagrammatic plan view of the pivotable resilient fastener mounted on the female end of the device with the male and female ends of the device in the closed (mated) position.
Figure 4:
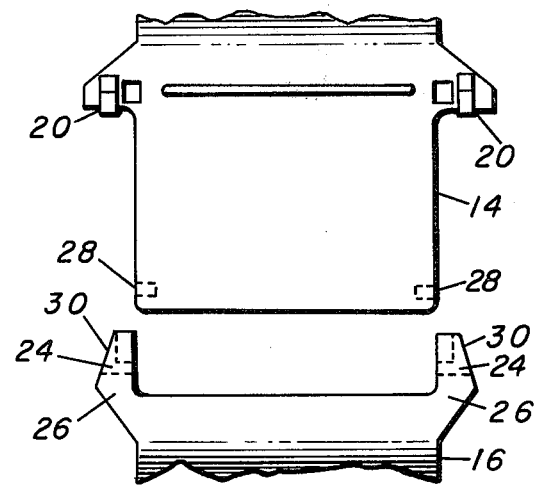
FIG. 4 is a plan top diagrammatic view of the male and female ends of the device in the open position with the pivotable resilient fastener removed from the female end.

The U-shaped pivotable resilient wire fastener 18, shown in FIG. 2, has a pin 22 formed at the end of each leg 23 thereof. Pins 22 are pivotably mounted in holes 24 through jaws 26 of second member end 16 and extend into holes 28 in first member end 14 so that legs 23 are positioned in the slots which are located in jaws 26 and communicate with holes 24 when the fastener 18 is in coupled position, as shown in FIG. 3. Due to the taper 30 on the back of each jaw 26, a camming action results when resilient fastener 18 is pivoted from the coupled position shown in FIG. 3 to the uncoupled position shown in FIG. 4, thereby spreading legs 23 sufficiently to withdraw pins 22 from the holes 28 in the first member end 14. Its pins 22 insert or retract to operatively engage or disengage holes 28 in the first member end 14. When in coupled position, the resilient fastener 18 is in the position shown in FIGS. 1 and 3.

The catches or keepers 20 each consist of an ear or projection with a notch adapted to cam lock the pivotable resilient fastener 18 as shown in FIGS. 1 and 3. By a nearly 180° pivoting of the resilient fastener 18 outwardly from the catch 20 the legs 23 of the fastener 18 are spread by cam action on the taper 30 on jaws 26 until the pins 22 are withdrawn from and no longer operatively engage the holes 28 in the first member end 14, thereby uncoupling the first member end from the second member end and allowing the device 10 to be opened. Closing of device 10 is effected by a reversal of the foregoing procedure.

It is noted that positive engagement of the resilient fastener with the two member ends of the device can only be effected by prior alignment of the holes 28 and 24. The device of this invention is a stressless mechanical coupling device rather than a device which, in its operation of coupling or closing, draws the two adjoining member ends together.

A device 10 for coupling adjoining member ends 14, 16 which comprises in combination:

a first member end 14;

a second member end 16 having two fixed jaws 26 for containing said first member end 14, wherein each of said jaws 26 is provided with a hole 24 therethrough which aligns with a corresponding hole 28 in the first member end when the ends 14, 16 are in coupled position;

a pivotable resilient fastening means 18 having arms 23 terminating in pins 22, which are pivotably mounted in said jaw holes 24 and extend into said first member holes 28;

means 30 on each of said jaws 26 adapted to cam and thereby spread the arms 23 of said fastening means 18 when said means (18) is pivoted to cause said pins 22 to be withdrawn from said first member holes 28; and means 22 on said first member end 14 adapted to catch said fastening means 18 in coupled position;

whereby said first and second member ends 14, 16 are coupled when the pins 22 of said pivotable resilient fastening means 18 extend into said holes 28 of the first member end 14, and are uncoupled when said pins 22 are withdrawn from said holes 28 of the first member end 14 by pivoting said resilient fastening means 18 to engage said cam means 30.

To those skilled in the art to which this invention relates, many changes in construction and widely different embodiments and applications of the invention will suggest themselves without departing from the spirit and scope of the invention. The disclosures and the description herein are purely illustrative and are not intended to be in any sense limiting.

I claim:

1. A device for coupling adjoining member ends which comprises in combination:

a first member end;

a second member end having two fixed jaws for containing said first member end, wherein each of said jaws is provided with a hole therethrough which aligns with a corresponding hole in the first member end when the ends are in coupled position;

a pivotable resilient fastening means having arms terminating in pins, which are pivotably mounted in said jaw holes and extend into said first member holes;

means on each of said jaws adapted to cam and thereby spread the arms of said fastening means when said means is pivoted to cause said pins to be withdrawn from said first member holes; and means on said first member end adapted to catch said fastening means in coupled position;

whereby said first and second member ends are coupled when the pins of said pivotable resilient fastening means extend into said holes of the first member end, and are uncoupled when said pins are withdrawn from said holes of the first member end by pivoting said resilient fastening means to engage said cam means.

2. The device according to claim 1, wherein said pivotable resilient fastening means consists of a U-shaped piece of wire.

3. The device according to claim 2, wherein said cam means is a taper on each jaw.

4. The device according to claim 3, wherein the taper is provided with a slot from said hole for receiving an arm of said U-shaped wire fastener when the latter is in coupled position.

5. The device according to claim 3, wherein said member ends are substantially flat.

6. The device according to claim 5, wherein said catch means comprises a notch in a projection on each side of said flat first member end.

7. The device according to claim 6, wherein said first and second member ends are those of a split grommet adapted for attachment circumferentially over the rotating band of a projectile.

8. The device according to claim 7, wherein the grommet is fabricated of polycarbonate resin.

* * * * *